No. 644,731. Patented Mar. 6, 1900.
R. COUSINS.
ARMOR FOR VEHICLE TIRES.
(Application filed Aug. 15, 1899.)
(No Model.)
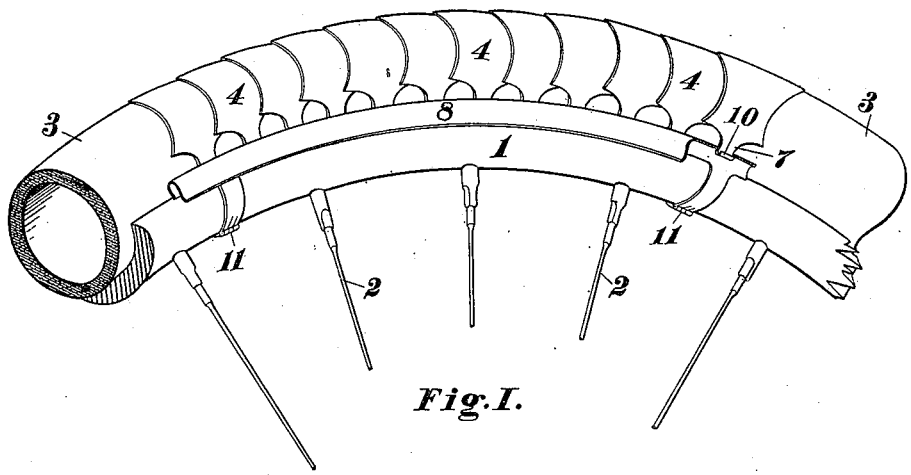
Fig. I.
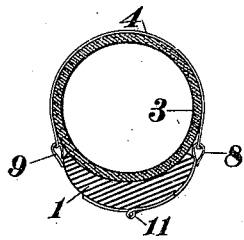
Fig. II.
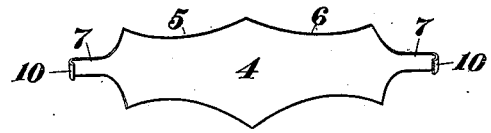
Fig. III.
Witnesses
P. W. J. Lander.
Elmer Wickes.
Inventor
Robert Cousins
By his Attorney
J. Richards & Co.

UNITED STATES PATENT OFFICE.

ROBERT COUSINS, OF SAN FRANCISCO, CALIFORNIA.

ARMOR FOR VEHICLE-TIRES.

SPECIFICATION forming part of Letters Patent No. 644,731, dated March 6, 1900.

Application filed August 15, 1899. Serial No. 727,320. (No model.)

*To all whom it may concern:*

Be it known that I, ROBERT COUSINS, a citizen of Great Britain, residing at San Francisco, county of San Francisco, and State of California, have invented certain new and useful Improvements in Velocipedes; and I hereby declare the following to be a full, clear, and exact description of the same, reference being had to the accompanying drawings, forming a part of this specification.

My invention relates to certain improvements in velocipedes or other like vehicles having flexible tires and to a means of protecting the latter from puncture and abrasive wear.

My improvements consist in an armor of sheet-metal scales of a peculiar form that overlap one another, entirely covering the exposed surface of the flexible tire, and adjustably held by a grooved or trough-shaped ring or hoop fastened to the rim of the wheels.

The objects of my invention are to preserve flexible tires from puncture and wear by hard substances without materially affecting the resilience and elasticity of such tires. To these ends I construct the wheels as shown in the drawings herewith, forming a part of this specification.

Figure I is a broken section of a wheel-rim provided with my improved tire-armor. Fig. II is a transverse section on the line $x\ x$ in Fig. I. Fig. III is a flat view showing one of the armor-plates extended flat.

Similar numerals of reference are applied to corresponding parts.

In the drawings, 1 is the wheel-rim, in which are fastened the spokes 2 in the usual manner.

3 is the elastic tire, commonly of gutta-percha, fitting into a concave seat in the rim 1, as seen in Fig. II.

The metallic armor consists in a series of scalloped plates 4, having curves 5 and 6 at the sides and fastening-tangs 7 at the ends, that pass through and are held by the trough-like rings 8 and 9 at each side, as seen in Fig. II. These plates 4 are preferably of steel, rendered resilient by being tempered, and are made long enough to wholly cover the tire where exposed and are curved to fit thereon, as seen in the section. In mounting these scales or plates 4 the tangs 7 pass through corresponding holes in the rings 8 and 9 and are then bent at the points, as shown at 10 in Figs. I and III, to prevent their withdrawal when in use. These tangs 7 pass loosely through the rings 8 and 9, so as to yield and be pressed inward, if required, when the wheel passes over an abrupt obstruction. Such movement is, however, inconsiderable, because the compression of the tire and plates radially is compensated by lateral expansion without moving the tangs 7.

The rings 8 and 9 are held by straps 11, that pass around the interior of the rim 1 at intervals, as shown in Fig. I, or are fastened thereto in any suitable manner.

Having thus explained the nature and objects of my invention and the manner of constructing and applying the same, what I claim as new, and desire to secure by Letters Patent, is—

1. In tire-armor, a series of overlapping plates embracing and covering the tire from side to side but not attached thereto and in combination therewith the trough-like rings 8 and 9 attached to the wheel-rim and provided with perforations to receive the tangs 7 of the armor-plates, substantially as specified.

2. In tire-armor, a series of overlapping plates having their flat surfaces smooth and provided at each end with tangs 7, the perforated trough-like rings 8 and 9 and means to attach the latter to the wheel-rim, substantially as specified.

3. In tire-armor, the flexible tire 3, armor-plates 4 and the rings 8 and 9 to which the armor-plates are so attached that the latter can move inward and the tangs 7 slide through the rings 8 and 9, substantially as specified.

4. In tire-armor, the combination of the flexible tires 3, armor-plates 4, the retaining-rings 8 and 9 attached to the wheel-rim by the bands 11 constructed and operating in the manner substantially as specified.

ROBERT COUSINS.

Witnesses:
PERCY W. J. LANDER,
ELMER WICKES.